United States Patent
Belling

(10) Patent No.: US 10,044,611 B2
(45) Date of Patent: Aug. 7, 2018

(54) MAPPING SELECTIVE DSCP VALUES TO GTP-U

(75) Inventor: Thomas Belling, Erding (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 157 days.

(21) Appl. No.: 14/388,069

(22) PCT Filed: Mar. 27, 2012

(86) PCT No.: PCT/EP2012/055440
§ 371 (c)(1),
(2), (4) Date: Sep. 25, 2014

(87) PCT Pub. No.: WO2013/143579
PCT Pub. Date: Oct. 3, 2013

(65) Prior Publication Data
US 2015/0036687 A1 Feb. 5, 2015

(51) Int. Cl.
*H04L 12/741* (2013.01)
*H04L 12/46* (2006.01)
*H04W 28/06* (2009.01)
*H04L 12/859* (2013.01)
*H04L 12/857* (2013.01)
*H04L 12/851* (2013.01)
(Continued)

(52) U.S. Cl.
CPC ......... *H04L 45/74* (2013.01); *H04L 12/4633* (2013.01); *H04L 47/2408* (2013.01); *H04L 47/2475* (2013.01); *H04L 47/2491* (2013.01); *H04W 28/06* (2013.01); *H04L 69/22* (2013.01); *H04W 76/12* (2018.02)

(58) Field of Classification Search
None
See application file for complete search history.

(56) References Cited

U.S. PATENT DOCUMENTS 6,038,309 A * 3/2000 Ram et al. ............ 379/229
9,014,158 B2 * 4/2015 Andreasen ........ H04L 12/4633
370/329

(Continued)

FOREIGN PATENT DOCUMENTS

WO  WO 2005/053224 A1  6/2005
WO  2009090387 A1  7/2009

OTHER PUBLICATIONS

International SWOearch Report and Written Opinion dated Jul. 16, 2012 corresponding to International Patent Application No. PCT/EP2012/055440.

(Continued)

*Primary Examiner* — Chi H Pham
*Assistant Examiner* — Shick Hom
(74) *Attorney, Agent, or Firm* — Squite Patton Boggs (US) LLP

(57) ABSTRACT

An apparatus and a method are provided by which a packet is received, a service identification in the packet is detected, it is decided based on the detected service identification whether a tunnel protocol extension header is to be generated or not, and, when the tunnel protocol extension header is to be generated, the tunnel protocol extension header is generated, the received packet is encapsulated with the generated tunnel protocol extension header and the encapsulated packet is forwarded.

21 Claims, 4 Drawing Sheets

(51) Int. Cl.
*H04L 29/06* (2006.01)
*H04W 76/12* (2018.01)

(56) References Cited

U.S. PATENT DOCUMENTS

| | | | | |
|---|---|---|---|---|
| 2005/0025178 | A1* | 2/2005 | Shirota | H04L 69/22 |
| | | | | 370/466 |
| 2008/0276085 | A1* | 11/2008 | Davidson et al. | 713/161 |
| 2009/0113013 | A1* | 4/2009 | Zhang | 709/206 |
| 2009/0213858 | A1* | 8/2009 | Dolganow | H04L 12/4633 |
| | | | | 370/395.5 |
| 2009/0296613 | A1 | 12/2009 | Kahn et al. | |
| 2011/0161521 | A1* | 6/2011 | McDysan et al. | 709/246 |
| 2012/0092992 | A1* | 4/2012 | Pappas | H04L 47/2491 |
| | | | | 370/235 |
| 2012/0163227 | A1* | 6/2012 | Kannan et al. | 370/252 |
| 2012/0198519 | A1* | 8/2012 | Parla et al. | 726/3 |
| 2013/0136091 | A1* | 5/2013 | Ludwig et al. | 370/329 |
| 2013/0163594 | A1* | 6/2013 | Sharma | H04L 45/64 |
| | | | | 370/392 |
| 2013/0170350 | A1* | 7/2013 | Sarkar | H04W 28/24 |
| | | | | 370/235 |
| 2013/0336199 | A1* | 12/2013 | Schwartz et al. | 370/315 |

OTHER PUBLICATIONS

3GPP TS 23.203 V11.5.0 (Mar. 2012), Technical Specification, 3rd Generation Partnership Project; Technical Specification Group Services and System Aspects; Policy and Charging Control Architecture (Release 11), Mar. 2012, 175 pages.

3GPP TS 29.060 V11.2.0 (Mar. 2012), Technical Specification, 3rd Generation Partnership Project; Technical Specification Group Core Network and Terminals; General Packet Radio Service (GPRS); GPRS Tunnelling Protocol (GTP) across the Gn and Gp Interface (Release 11), Mar. 22, 2012, 172 pages.

3GPP TS 48.018 V10.5.0 (Mar. 2012), Technical Specification, 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10), Mar. 16, 2012, 184 pages.

Communication pursuant to Article 94(3) EPC dated Feb. 21, 2018 corresponding to European Patent Application No. 12710946.0.

* cited by examiner

MAPPING SELECTIVE DSCP VALUES TO GTP-U

FIELD OF THE INVENTION

The present invention relates to apparatuses, methods and a computer program product for mapping selective DSCP values to GTP-U.

RELATED BACKGROUND ART

The following meanings for the abbreviations used in this specification apply:
APN Access Point Name
BSC Base Station Controller
BSSGP Base Station Subsystem GPRS Protocol
DSCP DiffServ Code Point
GERAN GERAN GSM/EDGE Radio Access Network
GGSN Gateway GPRS Support Node
GPRS General Packet Radio Service
GSM Global System for Mobile communications
GTP GPRS Tunneling Protocol
GTP-U GTP-User plane.
GW Gateway
IP Internet Protocol
PDN Packet Data Network
PDN-GW Packet Data Network Gateway (also P-GW)
PDP Packet Data Protocol
PMIP Proxy Mobile IP
S-GW Serving Gateway
TDF Traffic Detection Function
UE User Equipment 3GPP is currently working on "Service Identification for RRC Improvements in GERAN" (SIRIG). It is envisioned that the core network informs the GERAN radio network when downlink IP packets relating to specific applications are detected via deep packet inspection within the core network. The GERAN radio network will use this information to configure radio bearers according to the needs of the detected applications, e.g. by assigning a suitable number of timeslots for the bandwidth requirements of the application.

Within the core network, the deep packet inspection will either be performed by a GGSN/PDN-GW or by a stand-alone Traffic Detection Function (TDF) (see TS 23.203).

It has been agreed within 3GPP CT4 as a working assumption that the GGSN/PDN-GW using the GPRS Tunneling Protocol (GTP) (TS 29.060) will transfer the information towards the SGSN within a new extension header within the GTP user plane packets used to transfer the user plane relating to the specific application. If a standalone TDF is used, it will transfer the information to the GGSN/PDN-GW as DiffServ Code Point (DSCP) marks within the IP header of the inspected user plane packets and the GGSN/PDN-GW provides an interworking to GTP-U.

A GGSN using Proxy Mobile IP (PMIP) will transfer the information to the Serving-GW as DSCP marks within the IP header of the inspected user plane packets, and the Serving-GW will forward the information towards the SGSN within a new extension header within the GTP user plane packets used to transfer the user plane.

The SGSN will transfer the information on to the GERAN BSC using an extension of the Base Station Subsystem GPRS Protocol (BSSGP) (TS 48.018).

3GPP is also studying improvements for IP traffic handling for other radio networks than GERAN and might thus decide to use the new GTP-U header extension towards other radio networks in the future.

The DSCP header is a mandatory part of the IP header and always present. It is normally used for requesting priority treatment within IP routers.

The new GTP-U header extension, as described above, will increase the overall size of a GTP-U package by 8 byte and thus lead to extra bandwidth requirements where GTP is used. If the DSCP IP header is always interworked, the new GTP-U extension header will also be supplied for user plane packets that do not relate to applications that require special treatment, which leads to an unnecessary waste of resources.

SUMMARY OF THE INVENTION

Embodiments of the present invention address this situation and aim to reduce the use of resources in connection with the new extension header.

According to a first aspect of the present invention an apparatus is provided which comprises
  at least one interface unit configured to provide connection to at least one network, and
  a processor configured
  to receive a packet via the at least one interface unit,
  to detect a service identification in the packet,
  to decide based on the detected service identification whether a tunnel protocol extension header is to be generated or not, and,
  when the tunnel protocol extension header is to be generated, to generate the tunnel protocol extension header, to encapsulate the received packet with the generated tunnel protocol extension header and to forward the encapsulated packet.

According to a second aspect of the present invention, an apparatus is provided which comprises
  an interface unit configured to provide connection to a network, and
  a processor configured
  to receive a packet via the interface unit,
  to detect whether the packet relates to a specific application, and,
  when it is detected that the packet relates to the specific application, to insert a service identification in the packet based on the application, or,
  when it is detected that the packet does not relate to a specific application, to insert a default service identification in the packet.

According to a third aspect of the present invention, a method is provided which comprises
  receiving a packet from at least one network,
  detecting a service identification in the packet,
  deciding, based on the detected service identification, whether a tunnel protocol extension header is to be generated or not, and,
  when the tunnel protocol extension header is to be generated, generating the tunnel protocol extension header, encapsulating the received packet with the generated tunnel protocol extension header and forwarding the encapsulated packet.

According to a fourth aspect of the present invention, a method is provided which comprises
  receiving a packet,
  detecting whether the packet relates to a specific application, and,
  when it is detected that the packet relates to the specific application, inserting a service identification in the packet based on the application, or, when it is detected that the packet does not relate to a specific application, inserting a default service identification in the packet.

According to a fifth aspect of the present invention, a system is provided which comprises a gateway including an apparatus according to the first aspect or modifications thereof, and a transport detection function including an apparatus according to the second aspect or modifications thereof, wherein the processor of the gateway is configured to receive the packets sent from the transport detection function.

According to a sixth aspect of the present invention, a computer program product is provided which comprises code means for performing a method according to any one of the third to fourth aspects when run on a processing means or module.

Thus, according to embodiments of the present invention, a tunnel protocol extension header is generated only when necessary, so that the network load and required bandwidth for the corresponding packets can be reduced.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1:
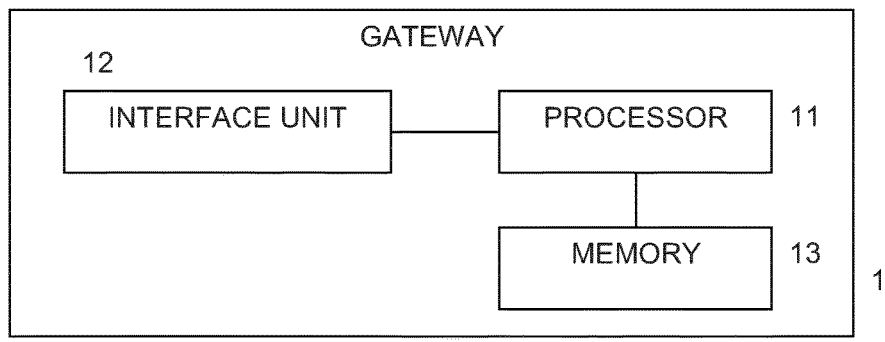
FIG. 1 shows a basic structure of a gateway according to an embodiment of the present invention.

FIG. 1 shows a gateway 1 as an example for an apparatus according to a more general embodiment of the present invention. The apparatus may be a network control node, e.g., a gateway such as a GGSN/PDN GW or a Serving-GW or may be only a part thereof, for example. The gateway 1 comprises a processor 11 and one or several interface unit(s) 12. The interface unit(s) 12 are configured to provide connection to one or several network(s), wherein the interface unit(s) 12 may be further configured to receive packets containing service identification such as DSCP and/or to send tunnel packets such as GTP-U user plane packet. The processor 11 is configured to carry out procedures which are illustrated in the flow chart of FIG. 2. Optionally, the gateway 1 may also comprise a memory 13 for storing data and programs, by means of which the processor 11 may carry out its corresponding functions.

Figure 2:
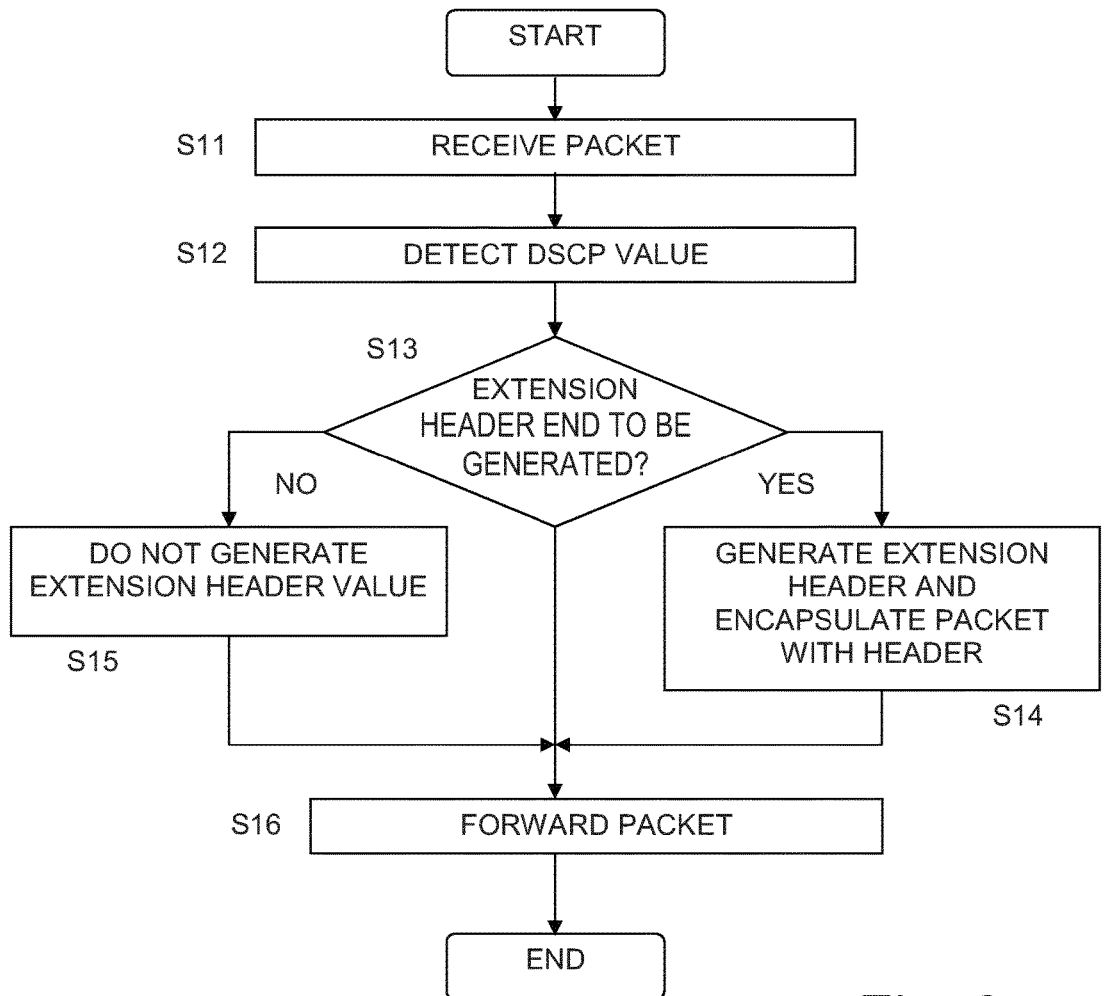
FIG. 2 shows a basic operation of a gateway according to an embodiment of the present invention.

FIG. 2 illustrates a basic operation as carried out by the gateway 1 of FIG. 1, for example. In step S11, a packet is received (e.g., via the interface unit 12). In step S12 a DCSP value (as an example for a service identification) is detected in the packet, e.g., the packet is evaluated whether such a value is present. In step S13, it is decided based on the detected DCSP value whether a tunnel protocol extension header (e.g., GTP-U extension header) is to be generated or not. If the tunnel protocol extension header is to be generated (YES in S13), the process proceeds to step S14, in which the tunnel protocol extension header is generated and the received packet is encapsulated with the generated tunnel protocol extension header. In step S10, the encapsulated packet is forwarded.

In case it is decided in step S13 that no tunnel protocol extension header is to be generated (NO in S13), no extension header is generated (S15) and the packet is forwarded without such a header in S16.

In addition, according to another embodiment, in step S13 the access point name (APN) may be considered to decide whether a tunnel protocol extension header is to be generated or not. For certain APNs, no tunnel extension header is generated. For other APNs, the received DSCP value is considered to decide whether a tunnel protocol extension header is to be generated or not.

Hence, according to certain embodiments of the present invention, the tunnel protocol extension header is generated only when it is needed, e.g., when an particular service or application requires a specific treatment, which is indicated by using the service indication (e.g., DCSP value).

Figure 3:
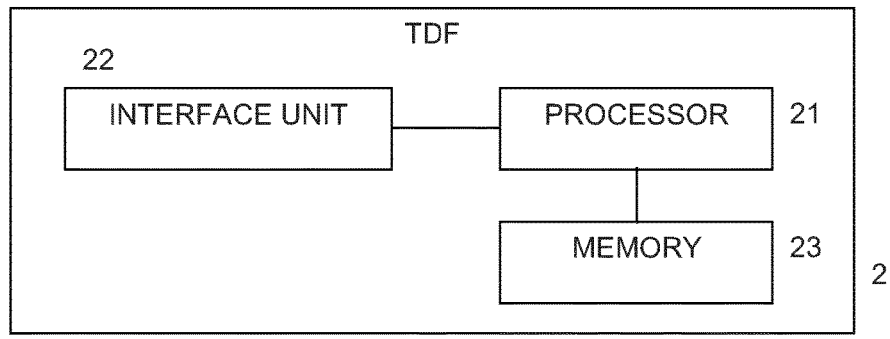
FIG. 3 shows a basic structure of a TDF according to an embodiment of the present invention.

FIG. 3 shows a TDF (transport detection function) 1 as an example for an apparatus according to a more general embodiment of the present invention. The apparatus may be TDF or may be only a part thereof, for example. The TDF 2 comprises a processor 21 and one or several interface unit(s) 22. The interface unit(s) 22 are configured to provide connection to one or several network(s), wherein the interface unit(s) 12 may be further configured to receive packets and/or to send packets containing service identification such as DSCP. The processor 21 is configured to carry out procedures which are illustrated in the flow chart of FIG. 4. Optionally, similar as in case of the gateway shown in FIG. 1, the TDF 2 may also comprise a memory 23 for storing data and programs, by means of which the processor 21 may carry out its corresponding functions.

Figure 4:
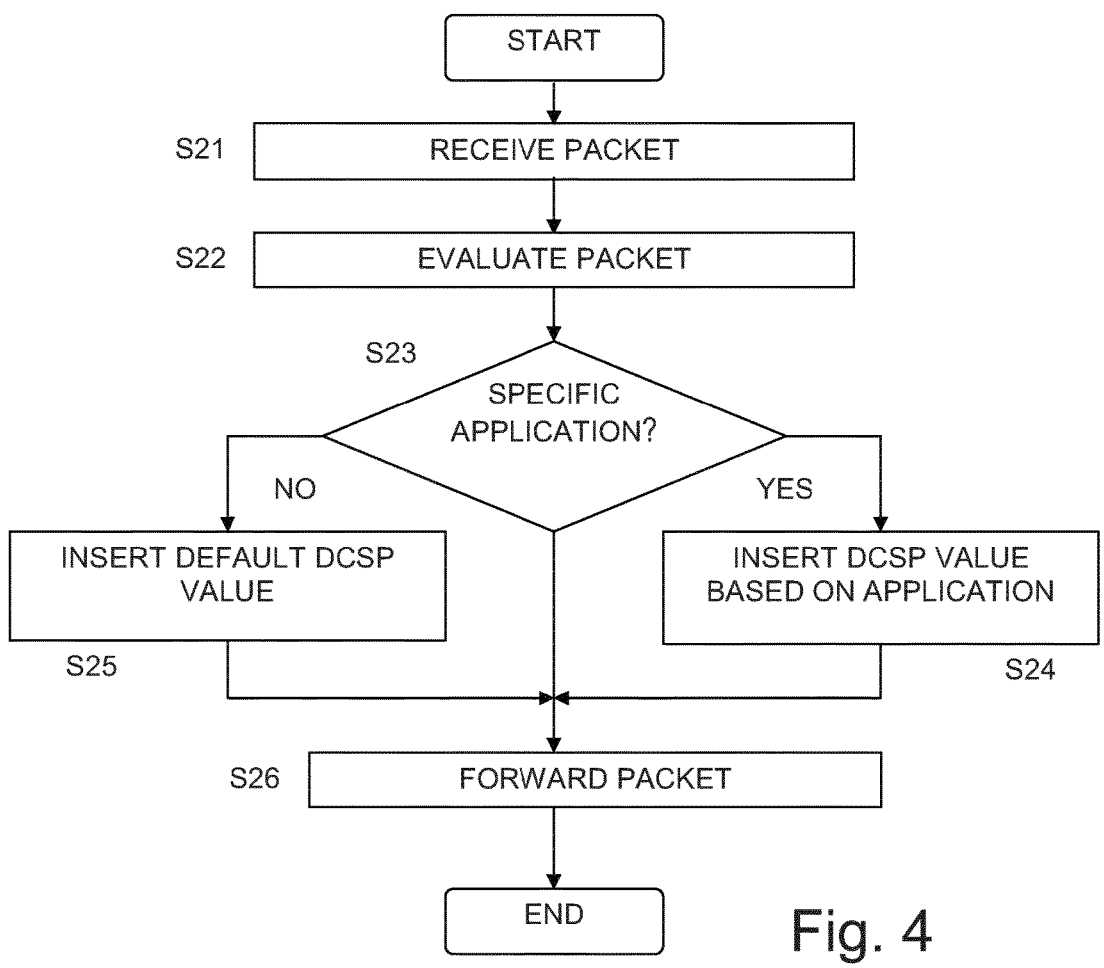
FIG. 4 shows a basic operation of a TDF according to an embodiment of the present invention.

FIG. 4 illustrates a basic operation as carried out by the TDF 2 of FIG. 3, for example. In step S21, a packet is received (e.g., via the interface unit 22). In step S22, the packet is evaluated, i.e., it is detected whether the packet relates to a specific application, and, when it is determined in step S23 (YES in S23) that the packet relates to the specific application, a DCSP value (as an example for a service identification) is inserted in the packet based on the application in step S24. When it is detected that the packet does not relate to a specific application (NO in S23), a default DCSP value (as an example for a default service identification) is inserted in the packet in S25. In step S16, the encapsulated packet is forwarded, for example to the gateway 1 shown in FIG. 1.

Hence, according to certain embodiments of the present invention, TDF always inserts a DSCP value, even when there is no specific application detected. In this way, an apparatus such as the gateway 1 can reliably decide whether to generate the tunnel protocol extension header for this packet or not.

The specific application described above may be a predefined application which requires special treatment such as providing a specific bandwidth, a specific data rate, a specific quality of service class, resource reservation for a specific duration, and/or a specific routing for the packet.

Thus, according to a more detailed embodiment of the present invention, a network control node such as a GGSN/PDN GW or Serving Gateway decides based on the value of the DSCP within a received IP packet whether to generate an GTP-U extension header for the GTP-U packet it uses to encapsulate and forward that IP packet.

In the following, implementation examples according to some embodiments of the present invention are described.

According to an embodiment, the GGSN/PDN GW or Serving Gateway uses an operator-configurable list of DCSP values to be interworked to GTP-U extension header to decide whether to generate a GTP-U extension header. For each such DSCP value to be interworked, the content of the GTP-U extension header to be supplied is also stored.

The GGSN may store several such operator configurable lists and select the appropriate list based on the Access Point Name (APN) negotiated for a Packet Data Protocol (PDP) session toward a user equipment (UE). This allows to handle scenarios where the downlink traffic towards a GGSN is received from several different IP networks (depending on APN) and/or only for some users a TDF is inserted.

According to a further embodiment, in order to avoid that the information which application specific handling is used by GERAN becomes visible to the UE, the GGSN may replace received DSCP values with a default DSCP value in the IP header of the IP packet encapsulated within GTP-U if the GGSN/PDN GW or Serving Gateway decides to provide the new GTP-U extension header.

Downlink IP packets may be received from an external network and DSCP values in this networks might be used for other purposes. To guarantee that no DSCP marks from untrusted sources in external networks are forwarded to the GGSN/PDN GW, the TDF is configured to perform DSCP marking for all passed IP packets. If the TDF does not identify an application requiring special treatment in the GERAN for a downlink IP packet, the TDF marks that IP packet with a default configured DSCP value that the GGSN does not interwork to the new GTP-U header extension. If the TDF identifies an application requiring special treatment in the GERAN for a downlink IP packet, the TDF marks that IP packet with a special configured DSCP value that the GGSN interworks to the new GTP-U header extension; the TDF is configured with an applicable DSCP value for each applications it can identify that requires special handling in the GERAN.

Figure 5:
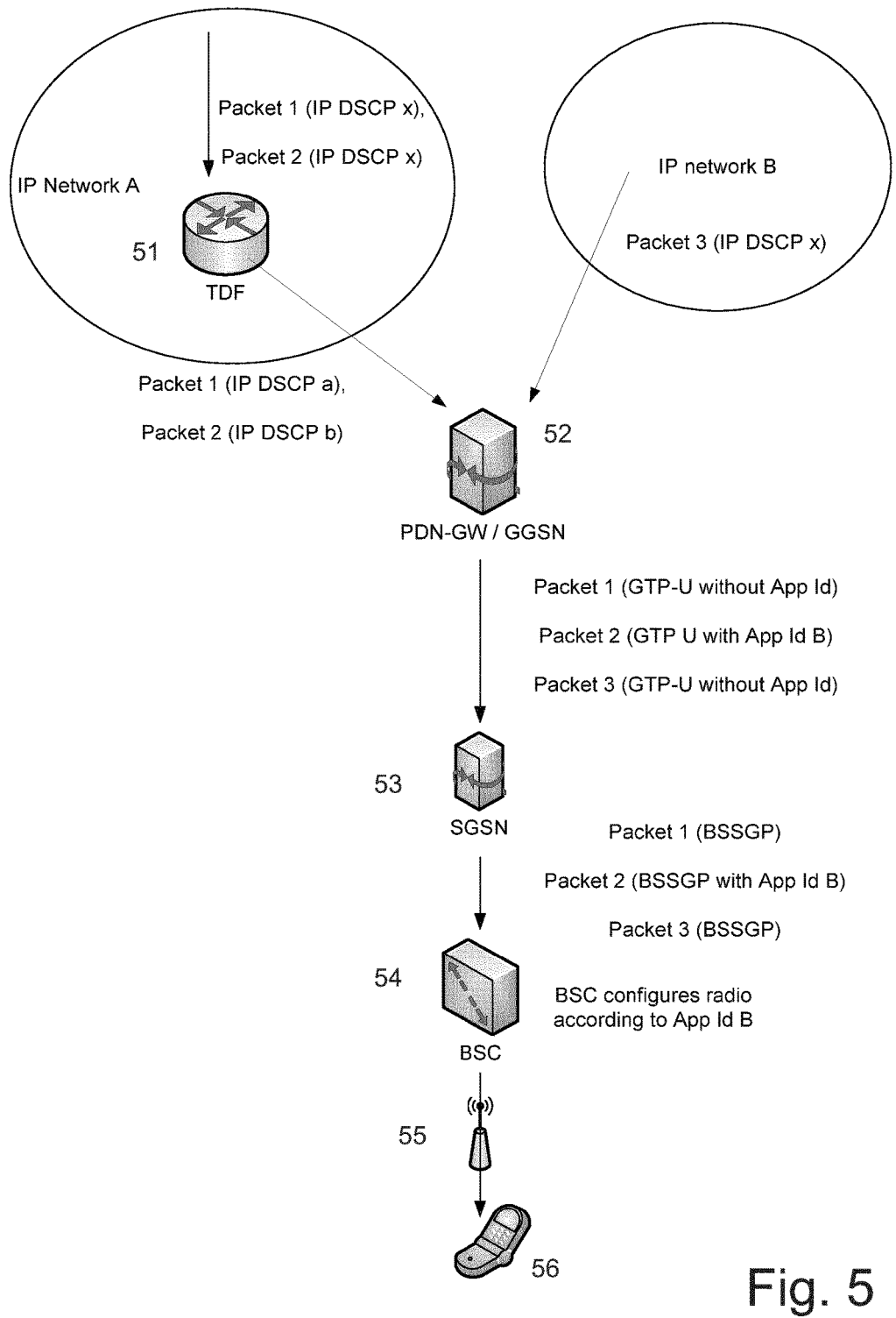
FIG. 5 shows an example arrangement of entities with a separate TDF according an embodiment of the present invention.

FIG. 5 shows an arrangement of entities and transfer of Downlink IP packets in case PDN-GW uses GTP according to a further embodiment of the present invention.

As shown in FIG. 5, a PDN-GW/GGSN 52 (in the following referred to as GGSN only) receives packets from a first network. IP network A, and from a second network. IP network B. The IP network A comprises a TDF 51.

The TDF 51 supplies IP DSCP markings for all IP packets it passes. It inspects the IP packets using deep packet inspection. For IP packet 2, the TDF discovers a particular application that requires a special DSCP marking "b". For IP packet 1, the TDF does not discover a particular application and thus applies a configured default DSCP marking "a". The GGSN 52 is configured per APN whether to map received DSCP values into GTP-U header extensions. The IP network the GGSN interconnects with also depends on the APN.

For the APN corresponding to IP network A the GGSN 52 is configured to map received DSCP values into GTP-U header extensions. For each IP package received in such an APN the GGSN then checks the received DSCP value to decide whether to generate a GTP-U header extension with an application ID.

For IP packet 2, the GGSN decides to generate a GTP-U extension header with Application ID "B" because there is a configured mapping for the received DSCP mark "b" towards the Application Id "B". For IP packet 1, the GGSN decides not to generate a GTP-U extension header with an Application ID because there is no configured mapping for the received DSCP mark "a".

For the APN corresponding to IP network B the GGSN is configured not to map received DSCP values into GTP-U header extensions. It thus does not generate an GTP-U extension header for IP packet 3 received from IP network B.

Thus, the GGSN 52 forwards packet 1 using GTP-U without the extension header, packet 2 using GTP-U with the extension header (indication App Id B), and packet 3 using GTP-U without the extension header to an SGSN 53. The SGSN 53 forwards the packets to a BSC 54 using BSSGP, wherein only packet 2 comprises App Id B.

The BSC 54 configures radio for connection to a UE 56 via a base station 55 according to App Id B only. That is, radio resources are configured such that they are suited for the application indicated by App Id B. Hence, packet 2 can be sent to the UE. For packets 1 and 3, however, no specific treatment is necessary, so that in connection with these packets no specific radio configuration is necessary.

Figure 6:
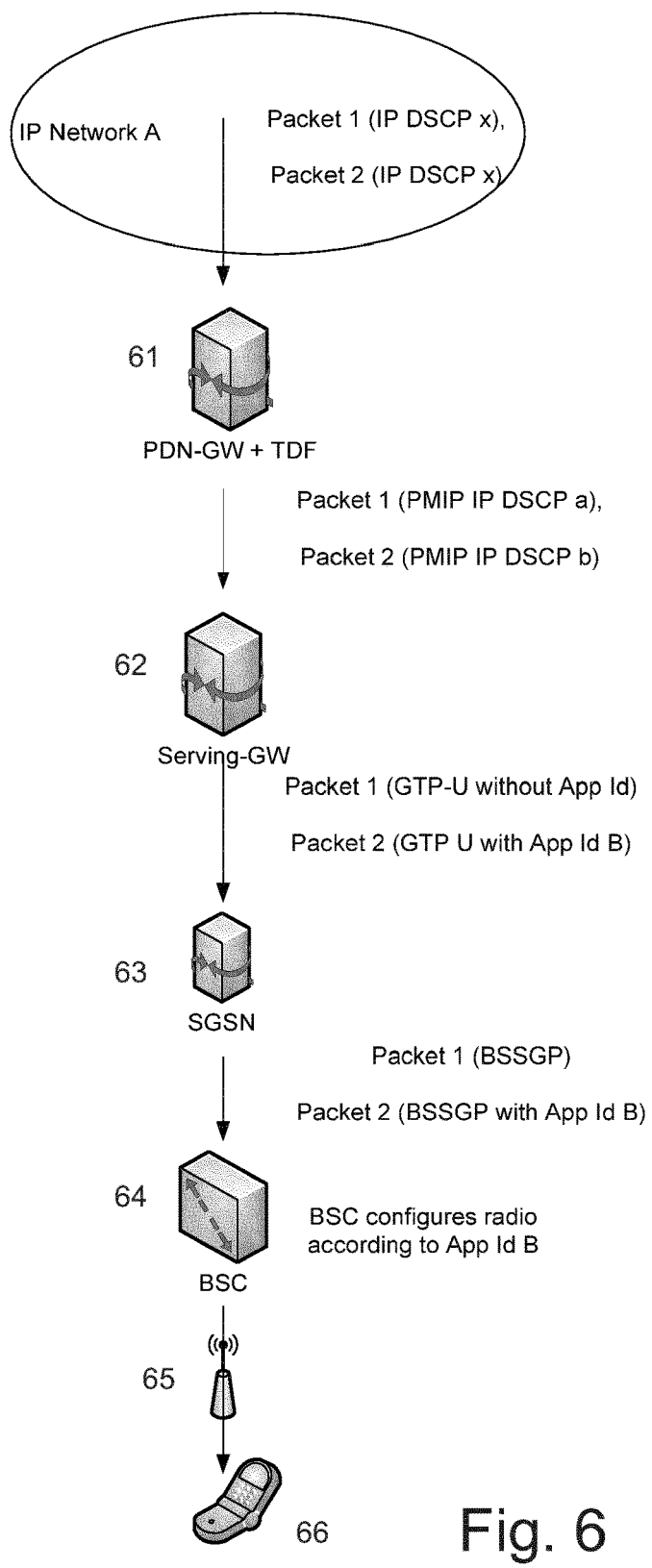
FIG. 6 shows an example arrangement of entities according an embodiment of the present invention, wherein the TDF is integrated in a PDN-GW.

FIG. 6 shows an arrangement of entities and transfer of Downlink IP packets in case PDN-GW uses PMIP according to another embodiment of the description.

In the example of FIG. 6, the TDF is integrated within the PDN-GW 61. However, the TDF could also be separate from the PDN-GW and would then be located on the core network side of the PDN-GW (e.g., then the TDF can be located in the IP network A, similar as shown in FIG. 5). The PDN-GW could then be configured to pass DSCP marks received from trusted networks with a separate TDF, and not to pass DSCP marks received from other networks but replace them with a configured default DSCP mark.

The PDN-GW 61 receives packets from the IP network A. The TDF supplies IP DSCP markings for all IP packets it passes. It inspects the IP packets using deep packet inspection. For IP packet 2, the TDF discovers a particular application that requires a special DSCP marking "b". For IP packet 1, the TDF does not discover a particular application and thus applies a configured default DSCP marking "a".

The Serving-GW 62 is configured per APN and/or per interconnected PDN-GW whether to map received DSCP values into GTP-U header extensions.

In this example, the Serving-GW 62 is configured to map received DSCP values into GTP-U header extensions for the APN corresponding to IP network A. For each IP package received in such an APN the Serving-GW 62 checks the received DSCP value to decide whether to generate a GTP-U header extension with an application ID.

For IP packet 2, the Serving-GW decides to generate a GTP-U extension header with Application ID "B" because there is a configured mapping for the received DSCP mark "b" towards the Application Id "B". For IP packet 1, the Serving-GW decides not to generate a GTP-U extension header with an Application ID because there is no configured mapping for the received DSCP mark "a".

The remaining procedure is similar to that described above in connection with FIG. 5, that is, the Serving-GW 62 forwards the packets to an SGSN 63, which forwards the packets to a BSC 64. The BSC supplies the packets to a base station 65, which forwards the packets to a UE 66.

It is noted that the embodiments and the present invention in general is not limited to the specific examples given above.

For example, in the above embodiments, the apparatus (e.g., gateway 1 shown in FIG. 1) deciding to generate the tunnel protocol extension header was described as a part of a gateway such as a GGSN/PDN-GW or Serving-GW. However, the apparatus may also be provided as a standalone network element, or it may be provided in another suitable network control node.

Furthermore, as also described already above, the apparatus (e.g., TDF 2 shown in FIG. 2) placing the service indications into the packets may be provided as a standalone network element (as shown in FIG. 5, for example), but can also be provided in another network element such as PDN-GW (as shown in FIG. 6, for example).

In some of the above embodiments. GTP was used as a tunnel protocol. However, the invention is not limited to this, and also other suitable protocols may be applied, as along as an extension header can be created.

Furthermore, in some of the above embodiments, DCSP was used as a service indication. However, the invention is not limited to this and other kinds of service indications may be applied, provided that the gateway 1 (or a similar apparatus) is able to detect and understand such a service indication.

Hence, according to certain embodiments of the present invention, an apparatus and a method are provided by which a packet is received, a service identification in the packet is detected, it is decided based on the detected service identification whether a tunnel protocol extension header is to be generated or not, and, when the tunnel protocol extension header is to be generated, the tunnel protocol extension header is generated, the received packet is encapsulated with the generated tunnel protocol extension header and the encapsulated packet is forwarded.

According to a further aspect of the present invention an apparatus is provided which comprises
  means for receiving a packet from at least one network,
  means for detecting a service identification in the packet,
  means for deciding, based on the detected service identification, whether a tunnel protocol extension header is to be generated or not, and,
  means for, when the tunnel protocol extension header is to be generated, generating the tunnel protocol extension header, encapsulating the received packet with the generated tunnel protocol extension header and forwarding the encapsulated packet.

According to another aspect of the present invention an apparatus is provided which comprises
  means for receiving a packet,
  means for detecting whether the packet relates to a specific application, and,
  means for, when it is detected that the packet relates to the specific application, inserting a service identification in the packet based on the application, or, when it is detected that the packet does not relate to a specific application, inserting a default service identification in the packet.

It is to be understood that any of the above modifications can be applied singly or in combination to the respective aspects and/or embodiments to which they refer, unless they are explicitly stated as excluding alternatives.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, UMTS, HSPA, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising
at least one interface unit configured to provide connection to at least one network, and
a processor configured
to receive a packet via the at least one interface unit,
to detect a service identification in the packet,
to decide, based on the detected service identification, between whether a tunnel protocol extension header is to be generated and whether the tunnel protocol extension header is not to be generated, and,
when the tunnel protocol extension header is to be generated, to generate the tunnel protocol extension header, to encapsulate the received packet with the generated tunnel protocol extension header and to forward the encapsulated packet,
wherein the service identification comprises a DiffServe Code Point (DSCP) value.

2. The apparatus according to claim 1, wherein the processor is configured to
to decide whether the tunnel protocol extension header is to be generated or not by referring to a predefined list of service identifications.

3. The apparatus according to claim 2, wherein the list comprises a content of the tunnel protocol extension header for the service identification.

4. The apparatus according to claim 2, wherein a plurality of the predefined lists are provided, and the processor is configured
to select an appropriate list of the plurality of predefined lists based on an access point name involved in a session in which the packet is received.

5. The apparatus according to claim 4, wherein the processor is configured
to decide based on the access point name involved in a session either to decide based on the detected service identification whether the tunnel protocol extension header is to be generated or not, or not to generate any tunnel protocol extension.

6. The apparatus according to claim 1, wherein the processor is configured
to replace the detected service identification with a default service identification.

7. The apparatus according to claim 1, wherein
the tunnel protocol extension header is a General Packet Radio Service Tunneling Protocol-User plane (GTP-U) extension header.

8. A system comprising a gateway including the apparatus according to claim 1, and a transport detection function including another apparatus comprising
another interface unit configured to provide connection to a network, and
another processor configured
to receive the packet via the another interface unit,
to detect whether the packet relates to a specific application, and,
when it is detected that the packet relates to the specific application, to insert the service identification in the packet based on the application, and,
when it is detected that the packet does not relate to the specific application, to insert a default service identification in the packet, and wherein
the processor of the gateway is configured to receive the packets sent from the transport detection function.

9. An apparatus comprising
an interface unit configured to provide connection to a network, and
a processor configured
to receive a packet via the interface unit,
to detect whether the packet relates to a specific application, and,
when it is detected that the packet relates to the specific application, to insert a service identification in the packet based on the application, and,
when it is detected that the packet does not relate to the specific application, to insert a default service identification in the packet,
wherein a list including a plurality of specific applications and service indications associated with each of the specific applications is provided, and the processor is configured to insert the service identification in the packet by referring to the list.

10. The apparatus according to claim 9, wherein the specific application is a predefined application which requires special treatment such as providing a specific bandwidth, a specific data rate, a specific quality of service class, resource reservation for a specific duration, and/or a specific routing for the packet.

11. The apparatus according to claim 9, wherein the apparatus is provided in transport detection function network element or in a gateway.

12. A method comprising
receiving a packet from a network,
detecting a service identification in the packet,
deciding, based on the detected service identification, between whether a tunnel protocol extension header is to be generated and whether the tunnel protocol extension header is not to be generated, and,
when the tunnel protocol extension header is to be generated, generating the tunnel protocol extension header, encapsulating the received packet with the generated tunnel protocol extension header and forwarding the encapsulated packet,
wherein the service identification comprises a DiffServe Code Point (DSCP) value.

13. The method according to claim 12, further comprising
deciding whether a tunnel protocol extension header is to be generated or not by referring to a predefined list of service identifications.

14. The method according to claim 13, wherein the list comprises a content of a tunnel protocol extension header for a service identification.

15. The method according to claim 13, wherein a plurality of predefined lists are provided, and the method further comprises
selecting an appropriate list of the plurality of predefined lists based on an access point name involved in a session in which the packet is received.

16. The method according to claim 12, further comprising
deciding, based on the access point name involved in a session either to decide based on the detected service identification whether a tunnel protocol extension header is to be generated or not, or not to generate any tunnel protocol extension.

17. The method according to claim 12, further comprising replacing the detected service indication with a default service indication.

18. The method according to claim 12, wherein
the tunnel protocol extension header is a GTP-U extension header.

19. A computer program product comprising code means embodied on a non-transitory computer-readable medium, said code means configured to perform the method according to claim 12 when run on a processing means or module.

20. A method comprising
receiving a packet,
detecting whether the packet relates to a specific application, and,
when it is detected that the packet relates to the specific application, inserting a service identification in the packet based on the application, and,
when it is detected that the packet does not relate to the specific application, inserting a default service identification in the packet,
wherein a list including a plurality of specific applications and service indications associated with each of the specific applications is provided, and the method further comprises
inserting the service identification in the packet by referring to the list.

21. The method according to claim 20, wherein the specific application is a predefined application which requires special treatment such as providing a specific bandwidth, a specific data rate, a specific quality of service class, resource reservation for a specific duration, and/or a specific routing for the packet.

* * * * *